Nov. 5, 1957  O. G. MOSHER  2,812,151
AUTOMATIC WEIGHING MACHINE
Filed Sept. 28, 1953  3 Sheets-Sheet 2
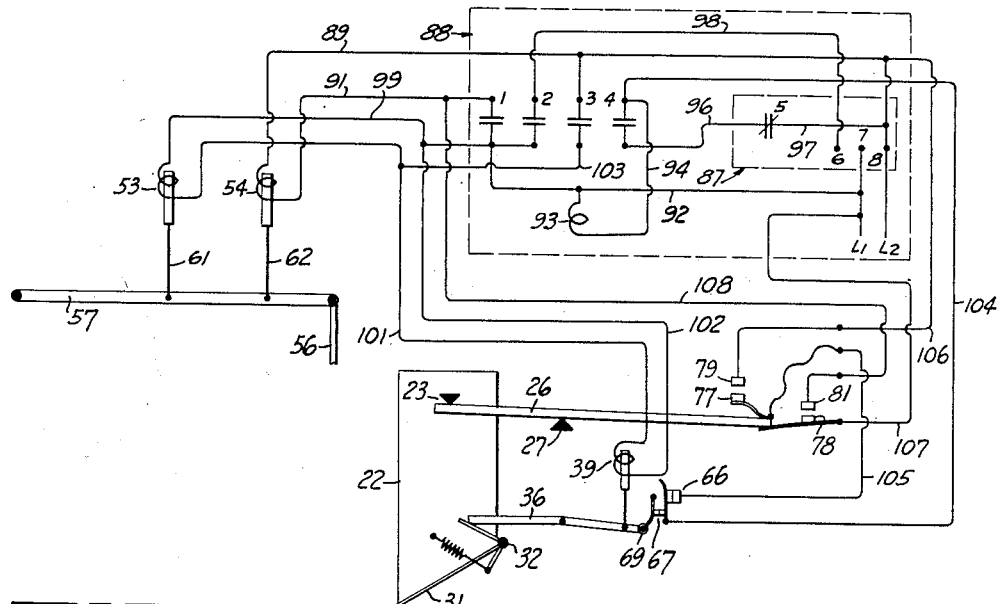
FIG_2_
FIG_3_
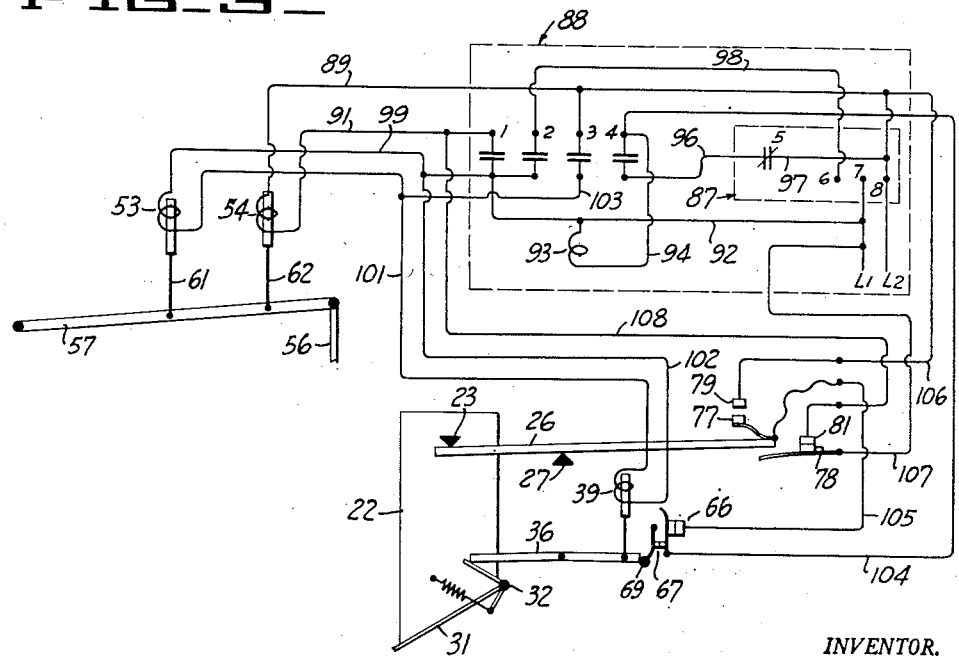
INVENTOR.
Oren G. Mosher
BY
ATTORNEYS

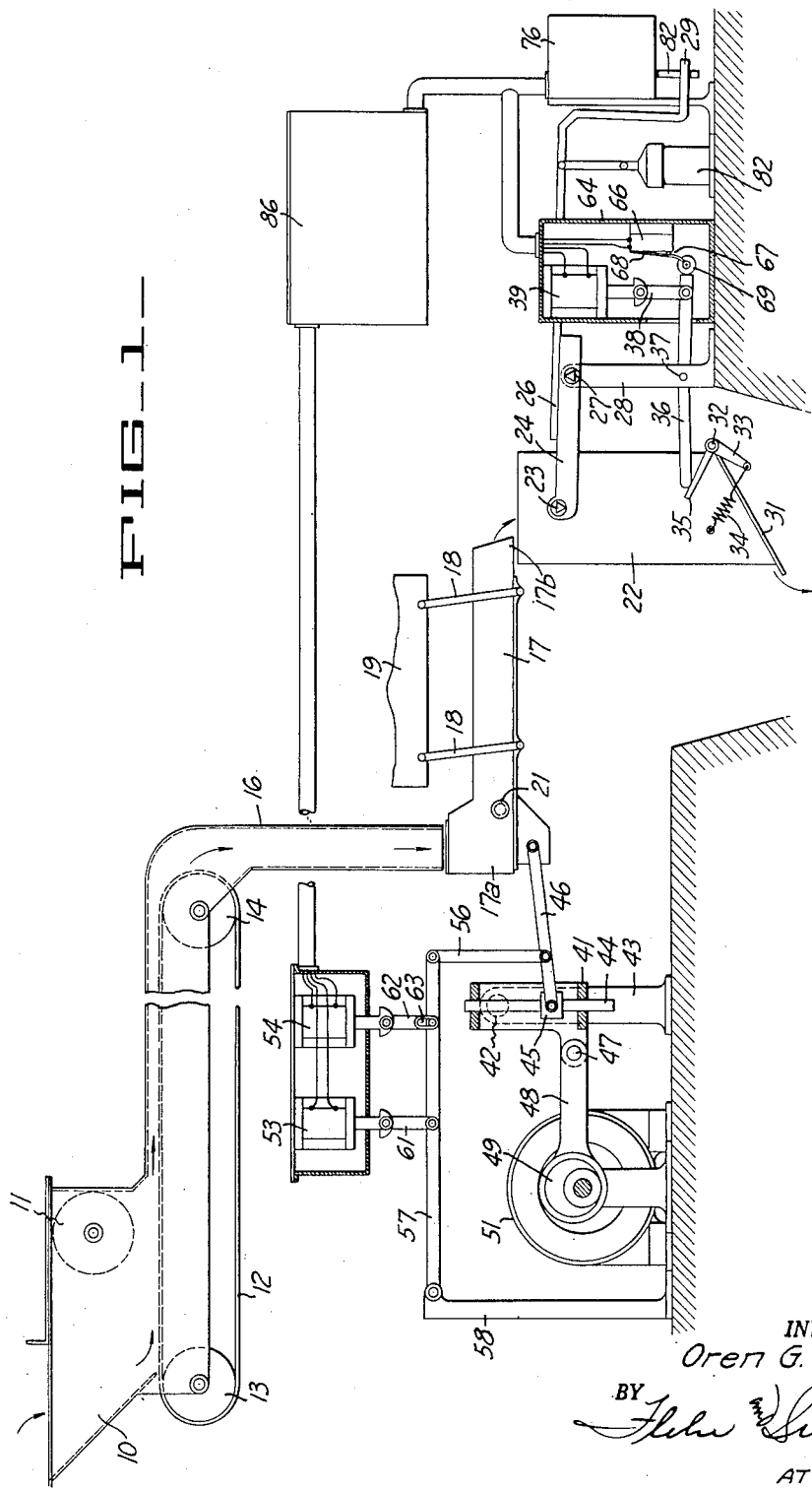

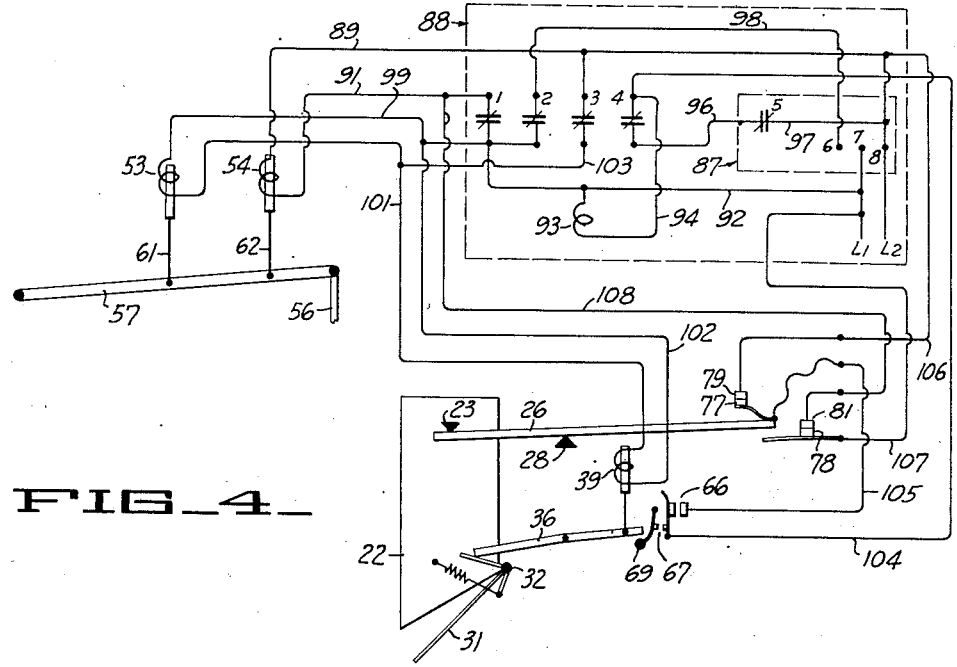
FIG_4

United States Patent Office 2,812,151
Patented Nov. 5, 1957

2,812,151
AUTOMATIC WEIGHING MACHINE

Oren G. Mosher, Oakland, Calif., assignor to Eagle Machinery Co., Ltd., San Francisco, Calif., a corporation of Nevada Application September 28, 1953, Serial No. 382,697

6 Claims. (Cl. 249—37)

This invention relates generally to automatic weighing equipment suitable for weighing out predetermined amounts of a bulk product.

In automatic weighing machines such as have been used for filling cartons or like containers, it has been common to use bulk and dribble feed means to increase the weighing accuracy. For example, the feed means can be in the form of troughs or pans with separate vibrating or shaker means attached to the same, and operated sequentially. In other words, the weigh is completed by the dribble feed pan, with the bulk feed pan remaining inoperative. Feed devices of this type are relatively elaborate and not as accurate as may be desired, particularly when used for feeding soft objects like dried prunes.

In general it is an object of the present invention to provide a weighing machine capable of producing an accurate weigh without the use of separately vibrated feed pans.

A further object of the invention is to provide a machine of the above character which is relatively simple in its construction and operation, and which can be used to advantage in the food industry for weighing of products like dried prunes.

Additional objects of the invention will appear from the following description in which the preferred embodiment of the invention has been set forth in detail in conjunction with the accompanying drawing.

Referring to the drawing:

Figure 1 is a schematic view illustrating a machine incorporating the present invention.

Figure 2 is a view schematically illustrating a portion of the machine, together with electrical circuit connections. The parts are positioned in this view as corresponding to the beginning of a weighing operation.

Figure 3 is the same as Figure 2 with certain operating parts in a different operating position, corresponding to the positioning of the parts when the weigh has been partially completed.

Figure 4 is the same as Figure 2, but with the parts in a different operating position, corresponding to the completion of a weigh.

In accordance with the present invention, I employ a single feed trough or pan of the shaker type, which is supplied with the product to be weighed. The trough is vibrated by shaker means which is so constructed that the amplitude of throw can be adjusted for high bulk or slow dribble feed. Automatic means is provided for controlling the shaker means in accordance with the weight of the product delivered to the weighing hopper.

In the embodiment illustrated in the drawing, I provide suitable means for receiving the bulk product, and for supplying it to a shaker trough. The trough in turn is arranged to deliver the material to a weighing hopper. Thus I have shown a suitable supply hopper 10, having agitating means such as a braking and leveling roller 11, which is located within its upper forward portion. A conveyor belt 12 is carried by the rollers 13 and 14, and has its upper run extending across the lower open end of the hopper. The belt serves to deliver the product to the discharge chute 16. Suitable means, such as one or more electric motors, can be used for driving the roller 11 and the conveyor 12.

The shaker feed trough or pan 17 has its one end portion 17a disposed below the lower open end of the chute 16. In order to permit this trough to be shaken in such a manner as to cause movement of the product from the feed to the discharge end 17b of the pan, it is shown supported by the links 18, which in turn are carried by some suitable part 19 of the machine.

It is desirable to provide photoelectric means in conjunction with the shaker path 17 to effect automatic control of the conveyor belt 12. For this purpose I have shown a photo cell 21 mounted upon one side of the pan, and which is connected with an electrical circuit (not shown) for controlling the driving of the belt 12. A suitable source of light is carried by the opposite side of the pan, and is arranged to provide a light beam directed laterally of the pan and upon the photo cell. When the pan 17 is supplied with an adequate amount of product to avoid interruption of its feed operation, the light beam is intercepted. However, when there is an interruption in the supply of objects being delivered by the chute 16, the light beam is not intercepted, and the motor circuit for the belt 12 is energized accordingly, whereby additional product is provided.

The weighing means which I employ in conjunction with the parts described above includes the hopper 22, which is disposed with its upper open end below the discharge end 17b of the shaker pan. Fulcrum 23 serves to carry hopper 22 upon the arm 24 of the weighing beam 26. The weighing beam in turn is carried by the fulcrum 27, which is schematically illustrated as mounted on the support 28. The arm 29 of the weighing beam is associated with an electrical contact assembly as will be presently explained.

The lower end of the weighing hopper 22 is normally closed, but it is opened for discharge of the product at the end of a weighing cycle. The means illustrated for this purpose includes a door 31 which extends across the lower end of the hopper, and which is carried by the rod or shaft 32. The arm 33 is attached to shaft 32, and is secured to the tension spring 34, whereby the door 31 is normally urged toward closed position. An operating finger 35 is also attached to the shaft 32, and is adapted to be moved to operate the door.

A lever 36 is fulcrumed at 37 to a stationary part of the machine, such as the support 28, and has its one end in proximity with the operating finger 35. The other end of lever 36 is attached by link 38 to the solenoid 39. It will be evident that when the solenoid 39 is energized to swing the lever 36 in a counterclockwise direction as viewed in Figure 1, the finger 35 is likewise swung in a counterclockwise direction, to effect opening of the door 31.

Instead of using vibrating or shaker means of the magnetic type, as commonly used with shaker pans, I provide motor driven eccentric means which can be adjusted to vary the amplitude of throw. Thus I provide a stirrup-like structure or member 41 which is pivotally attached at 42 to suitable means such as the supports 43. Member 41 serves to mount a rod 44, which is slidably engaged by the sleeve or collar 45. A link 46 has its one end pivotally attached to the collar 45, and its other end attached to the shaker pan 17. Member 41 also has a pivotal connection 47 to the eccentric rod 48. This rod connects with the eccentric means 49, which is driven continuously by suitable means such as the electric motor 51. It will be evident that the eccentric rod 48 serves to oscillate member 41 about the axis of pivotal connection 42, whereby collar 45 and link 46 are reciprocated at an amplitude depending upon the positioning of the collar 45 with respect to the axis of the pivotal connection 42. When collar 45 is coincident with the axis of pivotal connection 42, link 46 remains substantially stationary, while member 41 oscillates. On the other hand, as the collar 45 is lowered below the axis of pivotal connection 42, the amplitude of reciprocation applied to the link 46 is increased.

Solenoids 53 and 54 are provided for locating the collar 45 in any one of a plurality of positions. Connecting means is provided between the link 46 and the solenoids, and can include the link 56, together with the arm 57, the latter being carried by the support 58. Links 61 and 62 serve to attach operating members of solenoids 53 and 54 to the arm 57. Link 62 has lost motion with respect to arm 57, as is provided by the slot 63. The limiting positions of the solenoids are such that when both solenoids are deenergized, the collar 45 and link 46 assume the position shown in Figure 1. When solenoid 54 is energized, the collar 45 is raised to a position between its lowermost position and a position coincident with the axis of pivotal connection 42. When solenoid 53 is energized, collar 45 is positioned coincident with the axis of pivotal connection 42, so that no reciprocating or shaking movement is transmitted through link 46 to the pan 17.

The solenoids 53 and 54 are automatically energized in accordance with the weight of product supplied to the hopper 22. At the beginning of a weigh both solenoids 53 and 54 are deenergized, whereby maximum amplitude is applied to the shaker, for maximum rate of feed. As the amount of material delivered to the hopper 22 approaches the desired amount, solenoid 54 is energized to raise the collar 45 to an intermediate position, whereby the amplitude of vibration is greatly reduced, to reduce the rate of feed into the hopper 22 accordingly. When the weigh has been completed the solenoid 53 is energized whereby collar 45 is lifted to its uppermost position, coincident with the axis of pivotal connection 42, whereby the shaker remains stationary during the time interval immediately following, and which is of sufficient duration for dumping the weighed amount from the hopper 22.

As a part of the electrical circuit means employed, I have shown an electrical switch 66 which may be of the micro switch type, and which is associated with the lever 36. The operating member 67 of this switch is engaged by pivoted member 68, which carries the roller 69. For the position of the parts shown in Figure 1 the roller 69 engages one end of the lever 36, and the contacts of the switch are maintained closed. However, movement of lever 36 to open the door of the hopper 22 causes the contacts of the switch 66 to be opened. The purpose of switch 66 will presently be described in detail.

As previously mentioned the weighing beam is associated with electrical contact means, which in turn is associated with the electrical circuit for the solenoids 53 and 54. It is assumed in Figure 1 that these contacts are enclosed within the assembly 76. As schematically illustrated in Figures 2–4, I provide the movable contacts 77 and 78, and the stationary contacts 79 and 81. Both pairs of contacts are actuated by member 82 which has an operating connection with the rear end of arm 29. Thus, when a predetermined weight has been placed in the weighing hopper 22, which is slightly less than the total weight desired, movement of the weighing beam causes contacts 78 and 81 to be closed. When an additional weight has been placed on the weighing hopper 36, to complete the weigh, contacts 77 and 79 are closed.

It is desirable that the movement of the weighing beam be damped by suitable means such as a dash pot 83, in order to prevent undesirable swinging of the beam or chattering of the contacts.

In addition to the contact assembly 76, I provide a relay and time delay assembly 86 incorporating a time delay device 87 and a relay 88 (Figs. 2–4). The four pole relay 88 is provided with four sets of contacts 1, 2, 3 and 4, and winding 93. The time delay device 87 is provided with normally closed relay contacts 5 and terminals 6, 7 and 8. It is desirable that this time delay be of the vacuum tube type, such as the time delay manufactured by General Electric Company, of Schenectady, New York, under number C. R. 7504–A3D. Such a device utilizes a triode (not shown), the grid potential of which is controlled by the charging and discharging of a condenser. Plate current operates the winding of a relay (not shown) which is provided with the contacts 5.

The circuit diagram of Figures 2, 3 and 4 includes the current supply lines L1 and L2, which may be the standard 110 volt 60 cycle A. C. Conductor 89 connects the supply line L2 with one side of the solenoid 54. The other side of this solenoid is connected with one side of contacts 1 by conductor 91. The other side of contacts 1 is connected by conductor 92 to line L1. The winding 93 of relay 88 has one end connected to line 92 and has the other end connected to one side of contacts 4 by conductor 94. The other side of contacts 4 is connected by line 96 to one side of the relay contacts 5 of the time delay device 87. The other side of contacts 5 is connected to line L2 by line 97. Terminal 7 of the time delay 87 is connected to line L1 and terminal 8 is connected to line L2. Terminal 6 is connected to one side of contacts 2 by line 98. The other side of contacts 2 is connected to one side of solenoid 53 by line 99. The other side of solenoid 53 is connected to one side of solenoid 38 by conductor 101. The other side of solenoid 38 is connected to line 99 by line 102. One side of contacts 3 is connected to line 101 by line 103 and the other side is connected to line 89. One side of contacts 66 is connected to one side of contacts 4 by line 104 and the other side is connected to movable contact 77 by line 105. Stationary contact 79 is connected to line 89 by line 106. Movable contact 78 is connected to line L1 by line 107 and stationary contact 81 is connected to line 91 by line 108.

Operation of my weighing machine can now be reviewed as follows: The breaking and leveling roller 11 is operated at a predetermined speed of rotation and the feed belt 12 is periodically moved in response to the photo electric cell 21. Motor 52 is operated continuously at a predetermined speed. Assuming that dried prunes are to be handled by the machine, the prunes are delivered to the feed chute 16 at a proper average rate.

At the beginning of a weighing cycle the weighing hopper will be in its uppermost position as shown in Figure 2. In this position, both of the solenoids 53 and 54 are deenergized because contacts 77 and 79 and 78 and 81 are open and therefore the collar 44 is at its lowermost position to impart the maximum amplitude of vibration to the shaker pan 17. The product is thus conveyed by pan 17 at a maximum rate to the weighing hopper 22. When the bulk of the predetermined quantity of the product has been delivered to the weighing hopper 22, the weighing beam 36 swings sufficiently far to close the contacts 78 and 81, as shown in Figure 3. Closing these contacts causes energization of solenoid 54, which circuit can be traced from L1, conductor 107, contact 78, contact 81, line 108, line 91, the winding of solenoid 54, line 89 to L2. Energization of the solenoid 54 causes the arm 57 to be raised to bring the sleeve 44 to an intermediate position which serves to decrease the amplitude of reciprocation to the shaker pan 17 to a greatly reduced value. As a result, prunes continue to be fed into the weighing hopper 22, but at a slow dribble rate, until the weighing arm 26 swings sufficiently far to close contacts 77 and 79 as shown in Figure 4. Closing of contacts 77 and 79 energizes the winding 93 of relay 88, by a circuit which can be traced from line L1, line 92, winding 93, line 94, line 104, contact 66, contact 77, contact 79, and line 106, to L2. Energization of winding 93 closes contacts 1, 2, 3 and 4 of relay 88. Closing of the contacts 2 and 4 starts the timing cycle of the time delay device 87 by passing current into the time delay device through contacts 2 by a path which can be traced from L1, line 92, contacts 2 and line 98. Contacts 4 also serve to control a holding circuit for winding 93 to keep it energized irrespective of the chattering or opening of the contacts 77 and 79.

Closing of contacts 3 energizes solenoid 53 through a circuit which can be traced from L1, line 92, line 99, the winding of solenoid 53, line 103, contacts 3, line 89, to L2. At the same time that solenoid 53 is energized, solenoid 38 is energized because it is connected in parallel with solenoid 53 by lines 101 and 102.

The closing of contacts 1 establishes a holding circuit for solenoid 54 whereby solenoid 54 is maintained energized irrespective of opening or chattering of contacts 78 and 81. This circuit can be traced from L1, line 92, contacts 1, line 91, the winding of the solenoid 54, and line 89, to L2.

Energization of the solenoid 53 causes the arm 57 to be raised an increased amount to raise the collar 44 to its uppermost position, thereby stopping reciprocation of the shaker pan 17 to stop the delivery of dried prunes to weighing hopper 22. Energization of solenoid 39 swings lever 36 to cause it to open the door 31 to discharge the product from the weighing hopper. Operation of the arm 36 causes actuation of the operating member 67 to open the normally closed contacts of switch 66 to thereby open the circuit through contacts 77 and 79. The timing device 87 after completion of the timing cycle opens the contacts 5 to thereby deenergize the winding 93 of the relay 88. Deenergization of the winding 93 opens the relay contacts 1, 2, 3 and 4 which in turn deenergizes solenoids 53, 54 and 38. The door 31 is then swung shut by spring 34, contacts 66 are closed, and the sleeve 44 is dropped to its lowermost position to start the shaker pan reciprocating at its maximum amplitude to again load dried prunes into the weighing hopper 22.

It will be apparent from the foregoing that I have provided an automatic weighing machine which is capable of rapid and accurate successive weighing operations. A single shaker pan serves as both a bulk and a dribble feeder, by virtue of the manner in which the amplitude of vibration is adjusted.

I claim:

1. In an automatic weighing machine, a shaker pan, means for supplying a product to one end of the shaker pan, weighing means adapted to receive the product from the other end of the shaker pan, and means for applying vibratory movement to the shaker pan whereby the product is conveyed along the shaker pan to the discharge end thereof, said means including a member adapted to have one end rocked in an arcuate path, a collar attached to and slidably mounted with respect to said member, and means for sliding said collar to predetermined positions with respect to said member in accordance with the product discharged from the pan.

2. In an automatic weighing machine, a shaker pan, means for supplying a product to one end of the shaker pan, weighing means including a weighing hopper adapted to receive a product discharged from the other end of the shaker pan, and means for applying vibratory movement to the shaker pan whereby the product is conveyed over the shaker pan to the discharge end thereof, said means including a member adapted to have one end rocked in an arcuate path, a collar slidably mounted in said member, and means for sliding said collar to at least three predetermined positions with respect to said member to adjust the amplitude of reciprocating movement applied to the pan, said collar in one position applying maximum amplitude of vibration to the pan, in a second position applying a reduced amplitude of vibration to the pan, and in a third position permitting the pan to remain stationary, and means controlled by the amount of product supplied to the hopper for moving said member from said first to said second position as the weigh of product approaches the predetermined amount required, and for moving said member from said second to said third position when the amount of product equals the amount desired.

3. A machine as in claim 2 wherein said last named means includes at least two solenoids connected to said collar.

4. In an automatic weighing machine, a shaker pan, means for supplying a product to one end of the shaker pan, weighing means including a weighing hopper adapted to receive a product discharged from the other end of the shaker pan, and means for applying vibratory movement to the shaker pan whereby the product is conveyed over the shaker pan to the discharge end thereof, said means including a member adapted to be rocked in an arcuate path about one end of said member, a collar slidably mounted in said member, means for sliding said collar to any one of at least three predetermined positions with respect to said member to adjust the amplitude of reciprocating movement applied to the pan, said collar in a first position being farthest removed from the axis of pivotal movement of said member and applying maximum amplitude of vibration to the pan, in a second position being in a position between the axis of pivotal movement of said member and said first position and applying a reduced amplitude of vibration to the pan, and in a third position being coincident with the axis of pivotal movement of said member and permitting the pan to remain stationary, and means controlled by the amount of product supplied to the hopper for moving said collar from said first to said second position as the weigh of product approaches the predetermined amount required, and for moving said member from said second to said third position when the amount of product equals the amount desired.

5. A machine as in claim 2 in which said weighing hopper is provided with means for effecting automatic discharge of products therefrom at the end of the weighing cycle, together with timing means for effectively maintaining said member in said third position for a time interval sufficient for the discharge of the product from the hopper.

6. In an automatic weighing machine, a shaker pan, means for supplying a product to one end of the shaker pan, weighing means including a weighing hopper adapted to receive a product discharged from the other end of the shaker pan, means associated with said weighing hopper for effecting automatic discharge of a product therefrom at the end of a weighing cycle, means for applying vibratory movement to the shaker pan whereby a product is conveyed over the shaker pan to the discharge end thereof, said means including a member connected to said shaker pan which can be positioned in either one of at least three positions to adjust the amplitude of reciprocating movement applied to the pan, said member in one position applying maximum amplitude of vibration to the pan, in a second position applying a reduced amplitude of vibration to the pan, and in a third position permitting the pan to remain stationary, means controlled by the amount of product supplied to the hopper for moving said member from said first to said second position as the weigh of product approaches the predetermined amount required, and for moving said member from said second to said third position when the amount of product equals the amount desired, and timing means for effectively maintaining said member in said third position for a time interval sufficient for discharge of the product from said hopper.

References Cited in the file of this patent

UNITED STATES PATENTS

| | | |
|---|---|---|
| 1,858,328 | Heymann et al. | May 17, 1932 |
| 2,213,599 | Weckerly | Sept. 3, 1940 |
| 2,214,755 | Tafel | Sept. 17, 1940 |
| 2,258,182 | Howard | Oct. 7, 1941 |
| 2,299,636 | Mansbendel | Oct. 20, 1942 |
| 2,352,114 | Muskat | June 20, 1944 |
| 2,402,217 | Vredenburg | June 18, 1946 |
| 2,614,786 | Caron | Oct. 21, 1952 |